(12) United States Patent
Mody

(10) Patent No.: US 11,343,548 B2
(45) Date of Patent: May 24, 2022

(54) SYSTEMS AND METHODS FOR VIDEO PROCESSING

(71) Applicant: Texas Instruments Incorporated, Dallas, TX (US)

(72) Inventor: Mihir Narendra Mody, Bangalore (IN)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 16/402,422

(22) Filed: May 3, 2019

(65) Prior Publication Data

US 2019/0261037 A1 Aug. 22, 2019

Related U.S. Application Data

(63) Continuation of application No. 13/769,480, filed on Feb. 18, 2013, now Pat. No. 10,327,017.

(51) Int. Cl.
*H04N 19/12* (2014.01)
*H04N 21/2343* (2011.01)
*H04N 19/136* (2014.01)

(52) U.S. Cl.
CPC ..... *H04N 21/234309* (2013.01); *H04N 19/12* (2014.11); *H04N 19/136* (2014.11)

(58) Field of Classification Search
CPC ................. H04N 19/12; H04N 19/136; H04N 21/234309
See application file for complete search history.

(56) References Cited

U.S. PATENT DOCUMENTS

| 5,982,459 | A | 11/1999 | Fandrianto et al. | |
| 6,081,833 | A * | 6/2000 | Okamoto | H04L 49/309 709/213 |
| 8,127,058 | B1 * | 2/2012 | Sha | H04N 19/44 710/53 |
| 8,923,384 | B2 | 12/2014 | Schlanger et al. | |
| 2007/0088868 | A1 * | 4/2007 | Barry | G06F 13/28 710/28 |
| 2007/0103590 | A1 * | 5/2007 | Azar | G06F 3/14 348/459 |
| 2009/0175381 | A1 * | 7/2009 | Bougard | H04B 1/406 375/316 |

* cited by examiner

*Primary Examiner* — Dave Czekaj
*Assistant Examiner* — Berteau Joisil
(74) *Attorney, Agent, or Firm* — Charles F. Koch; Charles A. Brill; Frank D. Cimino

(57) ABSTRACT

Several systems and methods for processing of video frames based on one or more video formats are disclosed. In an embodiment, a video processing system comprises a memory and a video engine. The memory stores a plurality of video frames, a primary set of instructions and a plurality of secondary sets of processing instructions. Each secondary set of processing instructions is associated with a video format. The video engine is loaded with the primary set of instructions and is configured to fetch one or more video frames and a secondary set of processing instructions from the memory based on the loaded primary set of instructions. The fetched secondary set of processing instructions corresponds to a video format determined for processing of the one or more video frames. The video engine performs processing of the one or more video frames based on the secondary set of processing instructions.

8 Claims, 4 Drawing Sheets

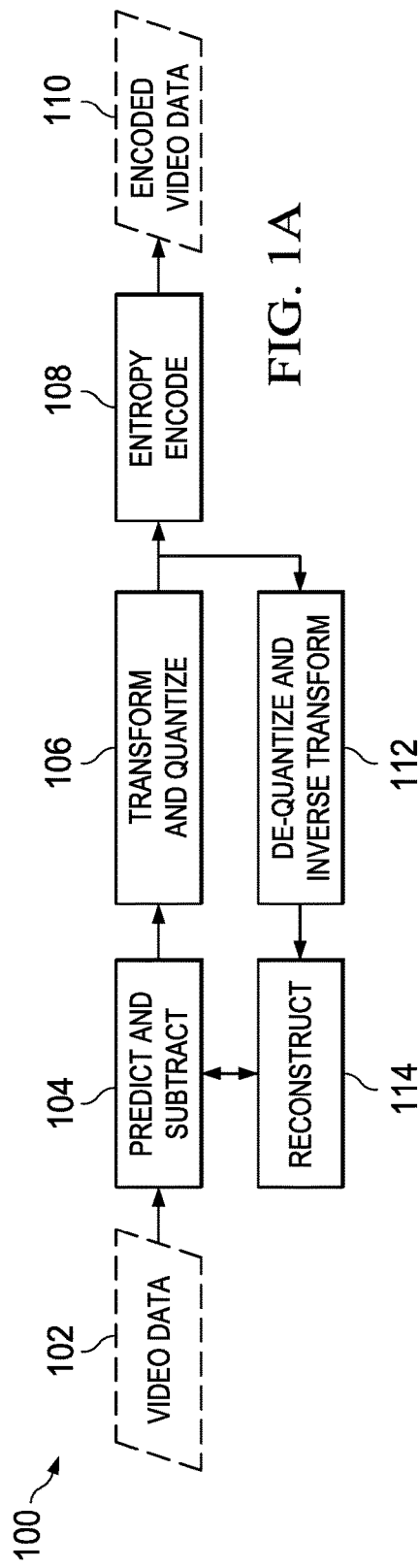
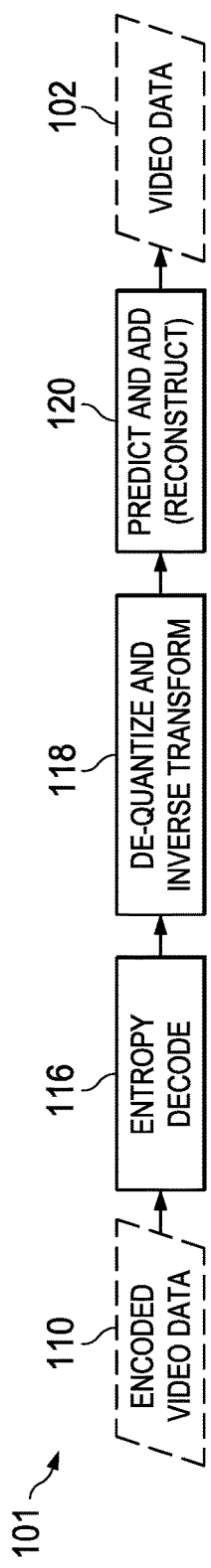
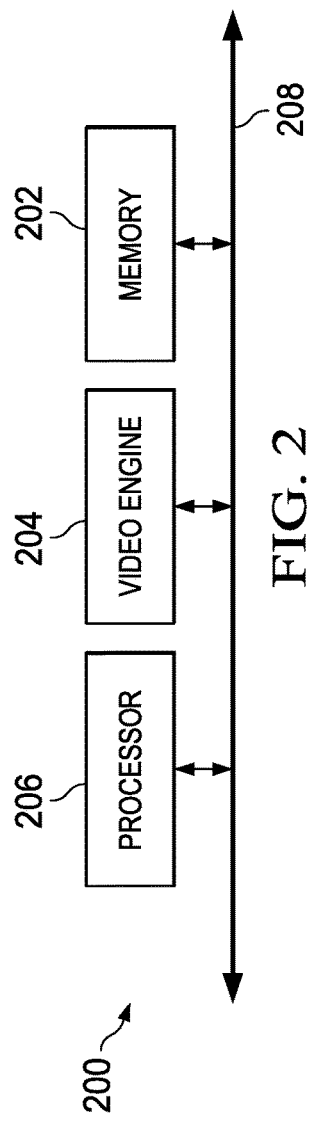

SYSTEMS AND METHODS FOR VIDEO PROCESSING

CROSS REFERENCED TO RELATED APPLICATIONS

This application is a continuation of U.S. patent application Ser. No. 13/769,480, filed Feb. 18, 2013, which is hereby fully incorporated herein by reference.

TECHNICAL FIELD

The present disclosure generally relates to the field of video data processing.

BACKGROUND

Pursuant to an exemplary scenario, video data captured by media capture devices, such as, for example, a camera or a camcorder, may be processed (for example, compressed) in order to save memory during storage or to efficiently utilize the available bandwidth during a transmission. The video data may be encoded utilizing encoding mechanisms that are sufficient to achieve compression of the video data. The video data may subsequently be decompressed (for example, decoded) for display/viewing purposes.

Pursuant to an exemplary scenario, video processing mechanisms may include a video controller (for example, a host processor), which may utilize software code corresponding to the various video compression standards, such as motion picture experts group (MPEG)-4, H.264, and the like, for processing of the video data. In some exemplary scenarios, dedicated hardware corresponding to common video formats, such as MPEG-1/2/4, H.264, etc. are utilized for processing of the video data, thereby precluding the processing of the video data by the video controller. However, such a provision of dedicated hardware may entail higher chip-area consumption, which may be prohibitive.

In some exemplary scenarios, a video engine designed to support encoder & decoder functionality for various video compression standards may be provided to perform a processing of the video data. Based on nature of a user-application, software code corresponding to an appropriate video compression standard may be loaded in the video engine by the video controller to facilitate the processing of the video data. For low-latency applications, such as video conferencing, or, for applications, such as video surveillance where video data is received from multiple end points, the decision for loading the appropriate software code is to be made at each video frame from among a plurality of video frames, thereby causing a sizable utilization of the video controller to take place.

SUMMARY

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter.

Various systems, methods, and integrated circuits configured for processing of video frames based on one or more video formats are disclosed. In an embodiment, a video processing system comprises a memory and a video engine. The memory is configured to store a plurality of video frames, a primary set of instructions and a plurality of secondary sets of processing instructions. Each secondary set of processing instructions from among the plurality of secondary sets of processing instructions is associated with a video format from among one or more video formats. The video engine is communicatively associated with the memory and is configured to be loaded with the primary set of instructions from the memory. The video engine is configured to fetch one or more video frames from among the plurality of video frames and a secondary set of processing instructions from among the plurality of secondary sets of processing instructions from the memory based on the loaded primary set of instructions. The secondary set of processing instructions corresponds to a video format from among the one or more video formats determined for processing of the one or more video frames. The video engine is further configured to perform processing of the one or more video frames based on the secondary set of processing instructions.

In an embodiment, the video engine comprises at least one direct memory access (DMA) module, at least one memory module and at least one processing module. The at least one memory module is configured to be loaded with the primary set of instructions from the memory. The at least one processing module is configured to program the at least one DMA module to fetch the one or more video frames and the secondary set of processing instructions from the memory and load the one or more video frames and the secondary set of processing instructions into the at least one memory module. In an embodiment, the at least one DMA module is programmed by the at least one processing module based on the primary set of instructions.

In an embodiment, the at least one processing module is further configured to program the at least one DMA module to fetch one or more subsequent video frames from among remaining video frames of the plurality of video frames for processing the one or more subsequent video frames based on the video format corresponding to the fetched secondary set of processing instructions. In an embodiment, the at least one processing module is further configured to program the at least one DMA module to fetch one or more subsequent video frames from among remaining video frames of the plurality of video frames and a secondary set of processing instructions corresponding to a different video format for processing the one or more subsequent video frames based on the different video format.

In an embodiment, the video processing system comprises a processor communicatively associated with the memory and the video engine and configured to program the at least one DMA module to fetch the primary set of instructions from the memory and load the primary set of instructions into the at least one memory module. In an embodiment, the at least one processing module is configured to program the at least one DMA module to fetch the primary set of instructions from the memory and load the primary set of instructions into the at least one memory module.

In an embodiment, an access to the at least one memory module by the at least one DMA module and the at least one processing module is staggered for conflict-free access to the at least one memory module. In an embodiment, programming of the at least one DMA module by the at least one processing module based on the primary set of instructions comprises configuring the at least one DMA module to interrupt the at least one processing module subsequent to completion of the loading of the one or more video frames and the secondary set of processing instructions into the at least one memory module to thereby stagger the access to the at least one memory module.

Additionally, in an embodiment, a video processing method for processing video frames based on one or more video formats is provided. In an embodiment, the video processing method includes selecting a memory configured to store a plurality of video frames, a primary set of instructions and a plurality of secondary sets of processing instructions. Each secondary set of processing instructions from among the plurality of secondary sets of processing instructions is associated with a video format from among one or more video formats. The video processing method further includes selecting a video engine communicatively associated with the memory, and, receiving the primary set of instructions at the video engine from the memory. Furthermore, the video processing method includes fetching, by the video engine, one or more video frames from among the plurality of video frames and a secondary set of processing instructions from among the plurality of secondary sets of processing instructions from the memory based on the received primary set of instructions. In an embodiment, the secondary set of processing instructions corresponds to a video format from among the one or more video formats determined for processing of the one or more video frames, and, performing processing of the one or more video frames by the video engine based on the secondary set of processing instructions.

Moreover, in an embodiment, an integrated circuit configured to process video frames based on one or more video formats is provided. In an embodiment, the integrated circuit comprises a memory and a video engine. The memory is configured to store a plurality of video frames, a primary set of instructions and a plurality of secondary sets of processing instructions. Each secondary set of processing instructions from among the plurality of secondary sets of processing instructions is associated with a video format from among one or more video formats. The video engine is communicatively associated with the memory and is configured to be loaded with the primary set of instructions from the memory. The video engine is configured to fetch one or more video frames from among the plurality of video frames and a secondary set of processing instructions from among the plurality of secondary sets of processing instructions from the memory based on the loaded primary set of instructions. The secondary set of processing instructions corresponds to a video format from among the one or more video formats determined for processing of the one or more video frames. The video engine is further configured to perform a processing of the one or more video frames based on the secondary set of processing instructions.

Other aspects and exemplary embodiments are provided in the drawings and the detailed description that follows.

BRIEF DESCRIPTION OF THE FIGURES

FIGS. 1A and 1B illustrate simplified overviews of exemplary processes for encoding and decoding video data for the processing of video data in accordance with an exemplary scenario;

FIG. 2 is a simplified block diagram of an exemplary video processing system configured to process video frames based on one or more video formats in accordance with an embodiment;

Figure 3:
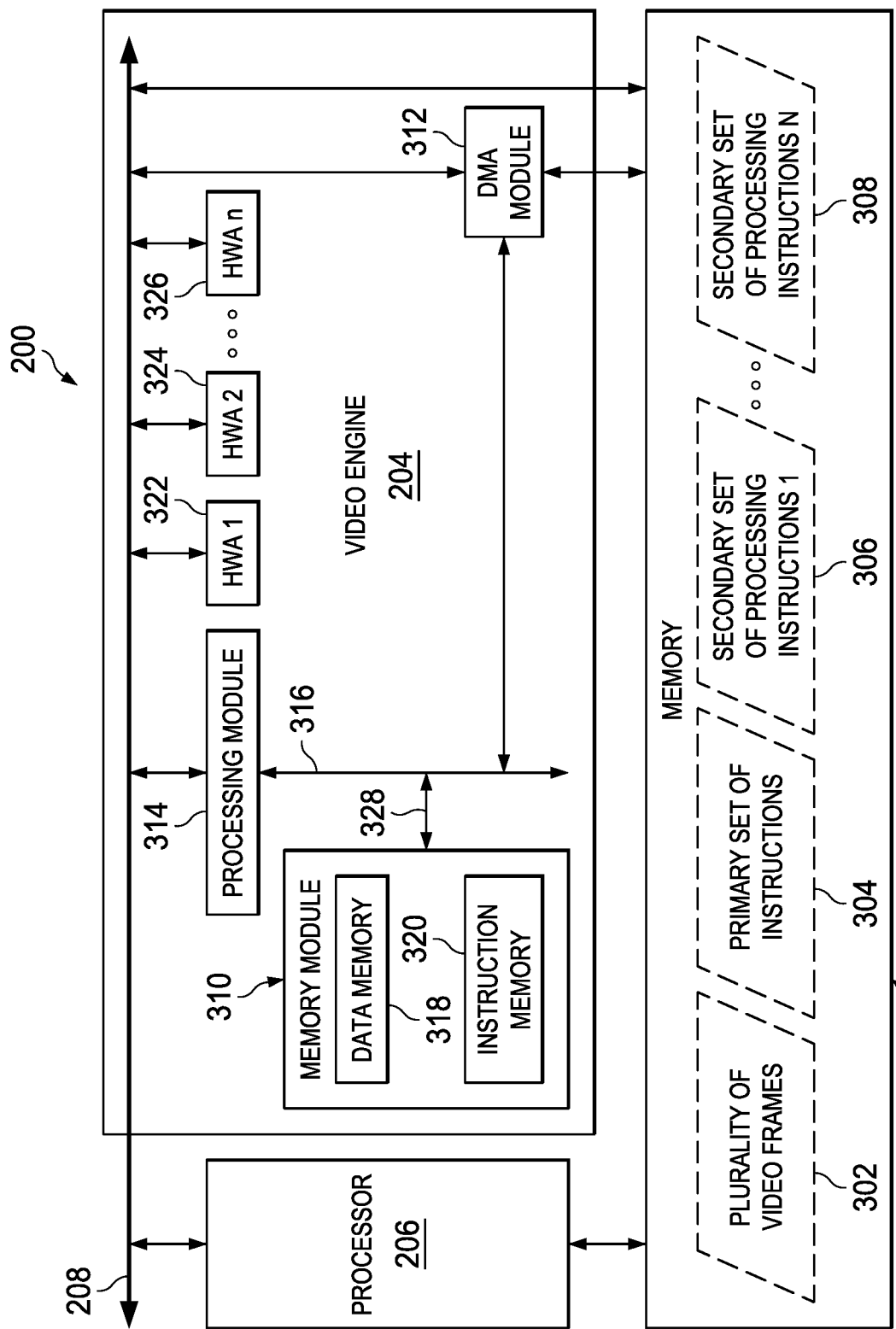
FIG. 3 illustrates a detailed block diagram of the video processing system of FIG. 2 configured to process video frames based on one or more video formats in accordance with an embodiment.

The drawings referred to in this description are not to be understood as being drawn to scale except if specifically noted, and such drawings are only exemplary in nature.

DETAILED DESCRIPTION

Pursuant to an exemplary scenario, processing of the video data may include performing encoding and/or decoding of the video data. Simplified overviews of encoding and decoding processes are explained herein with reference to FIGS. 1A and 1B.

FIGS. 1A and 1B illustrate simplified overviews of exemplary processes for the encoding and decoding, respectively, of video data (for example, video data 102) for the processing of the video data in accordance with an exemplary scenario. In particular, FIG. 1A illustrates a simplified overview of an encoding process flow 100 for encoding video data 102. Pursuant to an exemplary scenario, the encoding process flow 100 may be performed in order to achieve the compression of the video data 102. The video data 102 may be compressed so as to efficiently utilize a storage capacity during storage or a spectrum/bandwidth during a transmission.

The video data 102 may be received from a media capture device. Examples of the media capture device may include, for example, a video camera or a camcorder. The media capture device may be, for example, a stand-alone device or a part of a mobile device, such as, for example, a Smartphone, or a data processing device, such as, for example, a personal computer, a laptop device or a personal digital assistant (PDA). The video data 102 may also be received from a transcoding system (which may be implemented, for example, in any of hardware, software and/or firmware), which may be a stand-alone device or a part of the media capture device.

Pursuant to an exemplary scenario, the video data 102 may include a sequence of video frames, and each frame from among the sequence of frames may include a plurality of blocks (for example, a 4×4 block of pixels, a 16×16 block of pixels, and the like) of video data 102. At 104 of the encoding process flow 100, a prediction for each block from among the plurality of blocks of video data 102 is determined and subtracted from a current block being encoded in order to form residual data. The prediction for each block of video data 102 may be performed based on previously encoded blocks of video data 102, either from a current frame (for example, an intra prediction coding scheme) or from other frames that have already been encoded and transmitted (for example, an inter prediction coding scheme). The prediction for each block of video data 102 may be subtracted from the corresponding block in order to generate residual data corresponding to the each block.

After prediction and subtraction, at 106, the residual data is transformed (for example, from a spatial domain to a frequency domain) and quantized. The transformation of the residual data outputs a set of transform coefficients, each of which is a weighting value for a preselected basis pattern. The weighted basis pattern, when combined, is capable of recreating the residual data. The set of transform coefficients are then quantized (such as where each coefficient is scaled according to a scale-down factor, which may be a mathematical reciprocal of the scale-up factor specified by a video coding paradigm, thereby effectively setting a number of transform coefficients to a small value (including a zero value)) so as to achieve compression.

The quantized transform coefficients, along with certain information (such as, for example, information pertaining to the structure of compressed video data, information about a complete sequence of video data 102 and/or information that enables a decoder to re-create the prediction), are subjected to entropy encoding (for example, conversion into binary codes using variable length coding and/or arithmetic coding) at 108. The entropy encoding of the video data 102 produces an efficient, compact, binary representation of the information in the form of encoded video data 110.

The encoding process flow 100 further includes a reverse path for enabling a prediction for subsequent blocks of video data 102. The reverse path includes de-quantization of the quantized video data and inverse transformation of de-quantized video data. At 112, the quantized transform coefficients may be de-quantized (for example, scaled corresponding to a scale-up factor, which may be, in an exemplary embodiment, a value specified by a video coding paradigm) and then inversely transformed (for example, from a frequency domain to a spatial domain) in order to obtain the inversely transformed video data. The inversely transformed video data may be obtained in the form of reconstructed residual samples. The video data 102 may be reconstructed from the reconstructed residual samples at 114 by adding the prediction obtained at 104 to the reconstructed residual samples. The reconstructed video data may be utilized to enable a prediction of subsequent blocks of video data 102.

FIG. 1B illustrates a simplified overview of a decoding process flow 101 for decoding encoded video data 110. Pursuant to an exemplary scenario, the decoding process flow 101 may be performed in order to achieve the decompression of the video data 102. At 116, the encoded video data 110 may be entropy decoded (for example, converted from the binary form, first into intermediate symbols and thereafter into quantized transform coefficients along with the decoding of other encoded information). At 118, the quantized transform coefficients may be de-quantized (for example, scaled according to a scale-up factor, which may be, in an exemplary embodiment, a value specified by a video coding paradigm) and then inversely transformed to obtain the reconstructed residual data. The video data 102 may be reconstructed from the reconstructed residual samples at 120 by adding the prediction (for example, the prediction obtained at 104 of FIG. 1A) to the reconstructed residual samples. The reconstructed video data 102 may then be displayed for viewing purposes. It is noted that the encoding process flow 100 and the decoding process flow 101 may include additional steps or may skip certain steps as outlined in FIGS. 1A and 1B for purposes of encoding and decoding of video data, respectively.

Pursuant to an exemplary scenario, a video engine may be provided to perform such a processing of the video data. The video engine may be designed to support encoder & decoder functionality for various video compression standards. Based on the nature of a user-application, software code corresponding to an appropriate video compression standard may be loaded in the video engine by a video controller (for example, a host processor) in order to facilitate the processing of the video data. For low-latency applications, such as video conferencing, or, for applications, such as video surveillance where video data is received from multiple end points, decision for loading appropriate software code has to be made at every video frame, thereby causing a sizable utilization of the video controller. Various embodiments of the present technology, however, provide methods, systems, and integrated circuits for processing video data based on one or more video formats that are capable of overcoming these and other obstacles and providing additional benefits. The methods, systems and integrated circuits suggest techniques for configuring the video engine to perform self-loading of the software code and video frames corresponding to the video data for the processing of the video data, thereby sizably reducing utilization of the video controller. An exemplary system configured to process video frames corresponding to the video data is described herein with reference to FIG. 2.

FIG. 2 is a simplified block diagram of an exemplary video processing system 200 configured to process video frames based on one or more video formats in accordance with an embodiment. The video frames may correspond to video data, such as, for example, video data 102, and may include, for example, pictures, fields, and the like. As explained herein with reference to FIG. 1, the processing of the video frames may include performing compression/decompression of the video frames so as to efficiently utilize a storage capacity during storage or a spectrum/bandwidth during a transmission. The video frames may be compressed and/or decompressed based on one or more video compression standards. For purposes of the description, an encoding and a decoding format associated with video compression standards from among H.261, H.263, H.264, moving pictures experts group (MPEG)-1, MPEG-2, MPEG-4, real video (RV)-8, RV-9, VP6, VP7, VP8 and high efficiency video coding (HEVC) may be referred to as a video format. For example, a video format may correspond to a decoding format based on the H.264 video compression standard. Similarly, a video format may correspond to an encoding format based on the HEVC standard. The video processing system 200 may be configured to perform a processing of the video frames based on one or more of such video formats. For example, the video frames in a raw form (for example, unprocessed video frames from a media capture device, such as a camera or a camcorder) may be compressed based on any of the above-mentioned video formats associated with encoding video frames. Similarly encoded video frames may be decompressed based on any of the above-mentioned video formats associated with decoding video frames.

In an embodiment, the video processing system 200 may be configured within a multimedia system. Examples of the multimedia system may include, but are not limited to: (1) multimedia devices, such as, for example, cellular phones, digital video cameras and digital camcorders; (2) data processing devices, such as, for example, personal computers, laptops and personal digital assistants; and (3) consumer electronics, such as, for example, set top boxes, digital video disk (DVD) players and video network servers. Pursuant to an exemplary scenario, the video encoder may be any machine capable of executing a set of instructions (sequential and/or otherwise) so as to perform a processing of the video frames.

In FIG. 2, the video processing system 200 is depicted to include a memory 202, a video engine 204 and a processor 206. In an embodiment, the memory 202, the video engine 204 and the processor 206 are communicatively associated with each other. In an embodiment, the memory 202, the video engine 204 and the processor 206 are configured to communicate with each other via or through a bus 208. Examples of the bus 208 may include, but are not limited to, a data bus, an address bus, a control bus, and the like. The bus 208 may be, for example, a serial bus, a bi-directional bus or a unidirectional bus.

The memory 202 is configured to store a plurality of video frames. The video frames may be in one of an encoded form or a raw form (for example, unprocessed video frames received from a media capture device). Additionally, the memory 202 may store instructions for processing of one or more video frames from among the plurality of video frames. In an embodiment, the memory 202 may be configured to store a primary set of instructions and a plurality of secondary sets of processing instructions. In an embodiment, the primary set of instructions comprises a format-independent set of instructions capable of facilitating a fetching of video frames and a secondary set of processing instructions from among the plurality of secondary sets of processing instructions from the memory 202. In an embodiment, each secondary set of processing instructions from among the plurality of secondary sets of processing instructions is associated with a video format of the one or more video formats. For example, a secondary set of processing instructions may correspond to instructions for processing video frames based on the H.264 encoder video format. Moreover, in one embodiment, a secondary set of processing instructions may correspond to instructions for processing video frames based on the MPEG-4 decoder video format.

In an embodiment, the video engine 204 is a multi-format video engine configured to perform a processing of the video frames based on one or more video formats. In an embodiment, the video engine 204 is configured to be loaded with the primary set of instructions from the memory 202. In an embodiment, the processor 206 may be configured to facilitate a loading of the primary set of instructions from the memory 202 into the video engine 204. In an embodiment, the video engine 204 is configured to perform a self-loading (for example, fetching and loading) of the primary set of instructions from the memory 202.

In an embodiment, the video engine 204 is further configured to fetch one or more video frames and a secondary set of processing instructions from the memory 202 based on the loaded primary set of instructions. As explained above, the primary set of instructions may correspond to a format-independent set of instructions configured to enable a fetching and loading of video frames and a secondary set of processing instructions from the memory 202. Upon loading of the primary set of instructions into the video engine 204 from the memory 202, the video engine 204 may subsequently perform a fetching of the one or more video frames and a secondary set of processing instructions from the memory 202 based on the instructions included in the primary set of instructions. In an embodiment the fetched secondary set of processing instructions corresponds to a video format from among the one or more video formats determined for the processing of the one or more video frames. For example, if the video frames are determined to be processed based on the H.264 encoder video format, then the video engine 204 is configured to fetch the video frames (to be processed based on the H.264 encoder format) and a secondary set of processing instructions corresponding to the H.264 encoder video format from the memory 202 for the processing of the video frames based on the requisite video format. In an embodiment, the primary set of instructions may include pointers to memory locations, wherein the pointers may be implemented to fetch video frames and a secondary set of processing instructions corresponding to various video formats, thereby enabling a fetching and loading of the video frames and the secondary set of processing instructions.

The determination of the video format for the processing of the video frames may be performed based on a user application corresponding to the one or more video frames. In an embodiment, the processor 206 may be configured to determine the video format applicable to process the one or more video frames. In an embodiment, the video format for the processing of the one or more video frames may be pre-determined or determined dynamically, by the processor 206 based on a nature of the application (for example, a MPEG-2 encoded movie clip may be processed using a MPEG-2 decoder video format) and/or system enabled settings (for example, pre-defined setting of encoding surveillance video data based on a H. 264 video format).

In an embodiment, the video engine 204 is configured to perform a processing of the fetched one or more video frames based on the secondary set of processing instructions. In an embodiment, the video engine 204 may include one or more hardware accelerator modules configured to perform at least one of encoding and decoding of the plurality of video frames based on the one or more video formats. In an embodiment, each hardware accelerator module of the one or more hardware accelerator modules may be associated with a fixed functionality associated with the encoding/decoding of video frames, such as, for example, entropy coding, motion compensation, loop filter and the like. The format-specific secondary set of processing instructions may serve as the software that enables the hardware accelerator modules to process the video frames based on the determined video format. The processing of the video frames corresponding to the video data is explained in further detail herein with reference to FIG. 3.

In an embodiment, the video processing system 200 additionally includes components, such as an input unit (e.g., an image processing device), a video display unit (e.g., liquid crystals display (LCD), a cathode ray tube (CRT), and the like), a cursor control device (e.g., a mouse), a drive unit (e.g., a disk drive), a signal generation unit (e.g., a speaker) and/or a network interface unit. The input unit is configured to transfer the video frames corresponding to the video data to the memory 202 in order to facilitate a processing of the video frames. The drive unit includes a machine-readable medium upon which is stored one or more sets of instructions (e.g., software) embodying one or more of the methodologies and/or functions described herein. In an embodiment, the software resides, either completely or partially, within the memory 202, the video engine 204 and/or within the processor 206 during the execution thereof by the system 200, such that the memory 202, the video engine 204 and processor 206 also constitute a machine-readable media. The software may further be transmitted and/or received over a network via the network interface unit.

The term "machine-readable medium" may be construed, for example, to include a single medium and/or multiple media (e.g., a centralized and/or distributed database, and/or associated caches and servers) that store the one or more sets of instructions. Moreover, the term "machine-readable medium" may be construed, for example, to include any medium that is capable of storing, encoding and/or carrying a set of instructions for execution by the system 200 and that cause the system 200 to perform any one or more of the methodologies of the various embodiments. Furthermore, the term "machine-readable medium" may be construed to include, but shall not be limited to, solid-state memories, optical and magnetic media, and carrier wave signals. The foregoing notwithstanding, it is noted that the present technology is not limited to any particular definition of "machine-readable medium".

FIG. 3 illustrates a detailed block diagram of the video processing system 200 configured to process video frames based on one or more video formats in accordance with an embodiment. As explained herein with reference to FIG. 2, the system 200 includes the memory 202, the video engine 204 and the processor 206. The various components of the system, such as the memory 202, the video engine 204 and the processor 206 are configured to communicate with each other via or through a bus 208.

In an embodiment, the memory 202 is configured to store a plurality of video frames 302, a primary set of instructions 304 and a plurality of secondary sets of processing instructions such as a secondary set of processing instructions 306 and 308 (depicted to include a number of secondary sets of processing instructions from 1 to N). Each secondary set of processing instructions from among the plurality of secondary set of processing instructions corresponds to instructions for processing video frames based on a video format.

In an embodiment, the video engine 204 may include at least one memory module, such as a memory module 310, at least one direct memory access (DMA) module, such as a DMA module 312, and at least one processing module, such as a processing module 314. In FIG. 3, the inclusion of one memory module, one processing module and one DMA module in the video engine 204 is depicted for exemplary purposes, and it is noted that the video engine 204 may include two or more of each of such modules for processing of the video frames based on the one or more video formats. For example, the video engine 204 may include a global DMA module (for fetching video frames and instructions from the memory 202) and a local DMA module (for loading the fetched video frames and instruction into the memory module 310), wherein the global DMA module and the local DMA module may operate in conjunction with one another to perform the operations executed by the DMA module 312. Similarly, the video engine 204 may include two internal memories that may operate in conjunction with another to perform the operations executed by the memory module 310. In an embodiment, the memory module 310, the DMA module 312 and the processing module 314 are configured to communicate with each other via or through a bus 316. Examples of the bus 316 may include, but are not limited to, a data bus, an address bus, a control bus, and the like. The bus 316 may be, for example, a serial bus, a bi-directional bus or a unidirectional bus.

In an embodiment, any of the processor 206 and the processing module 314 may be embodied as a multi-core processor, a single-core processor, or a combination of one or more multi-core processors and one or more single-core processors. For example, any of the processor 206 and the processing module 314 may be embodied as one or more of various processing devices, such as a coprocessor, a microprocessor, a controller, a digital signal processor (DSP), processing circuitry with or without an accompanying DSP, or various other processing devices including integrated circuits such as, for example, an application specific integrated circuit (ASIC), a field programmable gate array (FPGA), a microcontroller unit (MCU), a hardware accelerator, a special-purpose computer chip, or the like. In an embodiment, any of the processor 206 and the processing module 314 may be configured to execute hard-coded functionality. In an embodiment, any of the processor 206 and the processing module 314 may be embodied as an executor of software instructions, wherein the instructions may specifically configure the processor 206 and/or the processing module 314 to perform the algorithms and/or operations described herein when the instructions are executed. The processor 206 and/or processing module 314 may include, among other things, a clock, an arithmetic logic unit (ALU) and logic gates configured to support an operation of the processor 206 and/or processing module 314. In an embodiment, the processing module 314 may be an advanced reduced instruction set computer (RISC) machine (ARM) processor.

In an embodiment, the memory module 310 comprises at least one of a data memory, such as data memory 318, and an instruction memory, such as an instruction memory 320. In an embodiment, the data memory 318 is configured to be loaded with the one or more video frames from among the plurality of video frames. In an embodiment, the instruction memory 320 is configured to be loaded with the instructions for the processing of the one or more video frames such as the primary set of instructions and one or more secondary set of processing instructions from among the plurality of secondary sets of processing instructions. Examples of the memory 202 and/or the memory module 310 may include, but are not limited to, a random access memory (RAM), a synchronous dynamic RAM (SDRAM), a double data rate SDRAM (DDR SDRAM), and the like.

In an embodiment, the video engine 204 includes a plurality of hardware accelerator modules such as hardware accelerator modules 322, 324, 326 (depicted as HWA 1, HWA 2 to HWA n in FIG. 3, respectively). As explained herein with reference to FIG. 2, each hardware accelerator module from among the plurality of hardware accelerator modules may be associated with a fixed functionality associated with the encoding/decoding of video frames, such as, for example, entropy coding, motion compensation, loop filter and the like. The format-specific secondary set of processing instructions may serve as the software that enables the hardware accelerator modules to process the video frames based on the determined video format. In an embodiment, the processing module 314 is associated with one or more hardware accelerator modules from among the plurality of hardware accelerator modules in order to facilitate a performance of at least one of encoding and decoding of the plurality of video frames based on the one or more video formats for processing of the one or more video frames. More specifically, the processing module 314 may utilize a known input/output and clock setting mechanisms in order to select appropriate hardware accelerator modules to perform encoding/decoding of the one or more video frames. In an embodiment, the processing module 314 may be communicatively associated with the one or more hardware accelerator modules via the bus 208.

As explained herein with reference to FIG. 2, the video engine 204 is configured to be loaded with the primary set of instructions from the memory 202. More specifically, the memory module 310 in the video engine 204 is configured to be loaded with the primary set of instructions from the memory 202. In an embodiment, the processor 206 may be configured to program the DMA module 312 to fetch the primary set of instructions from the memory 202 and load the fetched primary set of instructions into the instruction memory 320 of the memory module 310. In an embodiment, the video engine 204 is configured to perform a self-loading of the primary set of instructions. More specifically, the processing module 314 may be configured to program the DMA module 312 to fetch the primary set of instructions from the memory 202 and load the primary set of instructions into the instruction memory 320 of the memory module 310. As explained herein with reference to FIG. 2, the primary set of instructions comprises format-independent set of instructions for enabling fetching and loading of the one or more video frames and the secondary set of processing instructions into the video engine 204 from the memory 202.

In an embodiment, the processing module 314 is configured to program the DMA module 312 to fetch the one or more video frames and a secondary set of processing instructions from the memory 202 and load the one or more video frames and the secondary set of processing instructions into the memory module 310. In an embodiment, the fetched one or more video frames may be loaded into the data memory 318, and the fetched secondary set of instructions may be loaded into the instruction memory 320 of the memory module 310. In an embodiment, the DMA module 312 is programmed by the processing module 314 based on the primary set of instructions. As explained herein with reference to FIG. 2, the primary set of instructions may include pointers to memory locations, wherein the pointers may be implemented to fetch video frames and a secondary set of processing instructions corresponding to various video formats, thereby enabling a fetching and loading of the video frames and the secondary set of processing instructions. The processing module 314 may access the primary set of instructions loaded in the instruction memory 320, and, based on the loaded primary set of instructions, program the DMA module 312 so as to configure the DMA module 312 to fetch the one or more video frames and the secondary set of processing instructions.

In an embodiment, the DMA module 312 may be configured to fetch the secondary set of processing instructions corresponding to the video format determined for the processing of the one or more video frames. For example, if the one or more video frames are to be encoded based on the HEVC video format, then the DMA module 312 may fetch the secondary set of processing instructions corresponding to the HEVC encoding format from the memory 202. Upon loading the one or more video frames and the secondary set of processing instructions into the data memory 318 and the instruction memory 320, respectively, the processing module 314 may be configured to access the one or more video frames and the secondary set of processing instructions and, in conjunction with the plurality of hardware accelerator modules, perform a processing (for example, encoding and/or decoding) of the one or more video frames. In an embodiment, processing of the one or more subsequent video frames based on the same video format may involve fetching of only of the one or more subsequent video frames by the DMA module 312 and loading the fetched one or more subsequent video frames into the data memory 318. For processing one or more subsequent video frames based on a different video format, the processing module 314 may configure the DMA module 312 to fetch one or more subsequent video frames from among the remaining video frames of the plurality of video frames and a secondary set of processing instructions corresponding to a different video format for the processing of the one or more subsequent video frames based on the different video format. For example, if the initial set of one or more video frames are processed based on the MPEG-4 encoder video format and the subsequent set of one or more video frames are to be processed based on the same MPEG-4 encoder video format (for which the secondary set of processing instructions are already loaded in the instruction memory 320), then the DMA module 312 is configured to fetch only the one or more subsequent video frames from among the remaining video frames of the plurality of video frames from the memory 202. However, if the subsequent set of one or more video frames are to be processed based on a different video format, such as, for example, the H.264 encoder video format, then the DMA module 312 is configured to fetch the secondary set of processing instructions corresponding to the H.264 encoder video format along with the one or more subsequent video frames from among the remaining video frames.

In an embodiment, the primary set of instructions may be loaded into the memory module 310 at the time of initiation of the video engine 204. The loading of the video frames and the secondary set of processing instructions may be performed based on the primary set of instructions in an on-going manner thereafter based on various applications. For example, in low-latency applications such as a video call, the outgoing video frames may have to be encoded for transmission purposes whereas the incoming video frames may have to be decoded for viewing purposes. Accordingly, encoder/decoder software (for example, the secondary set of processing instructions) is to be changed on the video engine 204 for every frame in order to meet the specifications of the video call. In an exemplary scenario, for a 30 frame per second (fps) applications, the encoder/decoder software may be changed 30 times per second. Similarly for surveillance applications, multiple cameras may send video data in multiple formats, with a corresponding specification that the encoder/decoder software is to be changed on the video engine 204. As explained above, the video engine 204 performs a self-loading of the video frames and the secondary set of processing instructions based on the loaded primary set of processing instructions. The self-loading of the video frames and the secondary set of processing instructions precludes the utilization of the processor 206 for each switching of the encoder/decoder software on the video engine 204, thereby decreasing the loading of the processor 206. Further, low-latency application specifications, such as executing a high-resolution frame rate, may be met as a result of processing of the video frames by the multi-format video engine 204.

In an embodiment, self-loading of the video frames and the secondary set of processing instructions may result in the occurrence of conflict at the memory module 310. For example, the processing module 314 and the DMA module 312 may attempt to simultaneously access the memory module 310, thereby resulting in the occurrence of conflict. The processing module 314 may access the data memory 318 for accessing video frames or the instruction memory 320 for accessing the primary or secondary set of processing instructions, while the DMA module 312 may access the memory module 310 for loading the video frames and/or the secondary set of processing instructions. As a result of the data memory 318 and the instruction memory 320 being single-ported, as depicted by port 328 in FIG. 3, the memory module 310 may be accessed by either of the processing module 314 or the DMA module 312 at a specific point in time. In an embodiment, an access to the memory module 310 by the DMA module 312 and the processing module 314 is staggered such that conflict-free access to the memory module 310 may be achieved. In an embodiment, the DMA module 312 may be programmed by the processing module 314 based on the primary set of instructions to interrupt the processing module 314 subsequent to completion of the loading of the one or more video frames and the secondary set of processing instructions into the memory module 310 to thereby stagger the access to the memory module 310.

Figure 4:
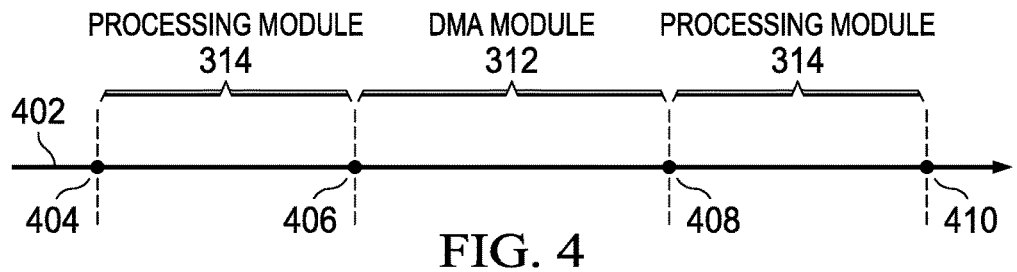
FIG. 4 depicts an exemplary scenario for illustrating a staggering of an access to a memory module in accordance with an embodiment.

The conflict-free access to the memory module 310 is explained herein further with reference to FIG. 4.

FIG. 4 depicts an exemplary scenario for illustrating a staggering of an access to the memory module 310 in accordance with an embodiment. As explained herein with reference to FIG. 3, the self-loading of the video engine 204 may result in the occurrence of a conflict at the single-ported memory module 310 as the processing module 314 and the DMA module 312 may attempt to simultaneously access the memory module 310. The staggering of the access to the memory module 310 enables conflict-free access to the video frames and the instructions stored in the memory module 310.

FIG. 4 depicts a time line 402 of the mastership (for example, access rights) of the port 328 of FIG. 3. At time instant 404 on the time line 402, the processing module 314 of the system 200 may attain mastership of the port 328 providing access to the data memory 318 and the instruction memory 320. The processing module 314 may maintain mastership of the port 328 until time instant 406. During the time duration between time instances 404 and 406, the processing module 314 may (1) access the primary set of instructions loaded in the instruction memory 320 and (2) program the DMA module 312 for fetching of the one or more video frames and the secondary set of processing instructions corresponding to a video format from the memory 202 and loading of the one or more video frames and the secondary set of processing instructions into the memory module 310. The processing module 314 may acquire addresses of locations in the memory 202 where video frames and the appropriate secondary set of processing instructions are stored. Further addresses of location in the data memory 318 and the instruction memory 320 where the video frames and the secondary set of processing instructions are to be loaded may also be acquired by the processing module 314. Based on the location addresses, the processing module 314 may program the DMA module 312 to perform fetching and loading of video frames and a secondary set of processing instructions. The processing module 310 may further configure the DMA module 312 to interrupt itself upon completion of the loading. Upon programming the DMA module 312 based on the primary set of instructions, the processing module 314 may sleep at time instant 406.

Subsequently, the DMA module 312 may acquire the mastership of the port 328 until time instant 408. The DMA module 312 may perform fetching and loading of the one or more video frames and the secondary set of processing instructions. More specifically, the DMA module 312 may fetch the one or more video frames and the secondary set of instructions from the memory 202 and load the one or more video frames into the data memory 318 and the secondary set of processing instructions into the instruction memory 320. Upon completion of the loading, the DMA module 312 may interrupt the processing module 314 at time instant 408. At time instant 408, the processing module 314 may wake up from sleep and acquire mastership of port 328 to thereby access the one or more video frames and the secondary set of processing instructions loaded into the memory module 310. The processing module 314, in conjunction with the one or more hardware accelerator modules from among the plurality of hardware accelerator modules may perform processing of the one or more video frames based on the secondary set of instructions. At time instant 410, the processing module 314 may complete the processing of the one or more video frames based on a video format. Such a staggered access to the memory module 310 may preclude the occurrence of conflict while a self-loading of the video frames and the secondary set of processing instructions is performed by the video engine 204. A video processing method configured to process video frames based on one or more video formats is explained with reference to FIG. 5.

Figure 5:
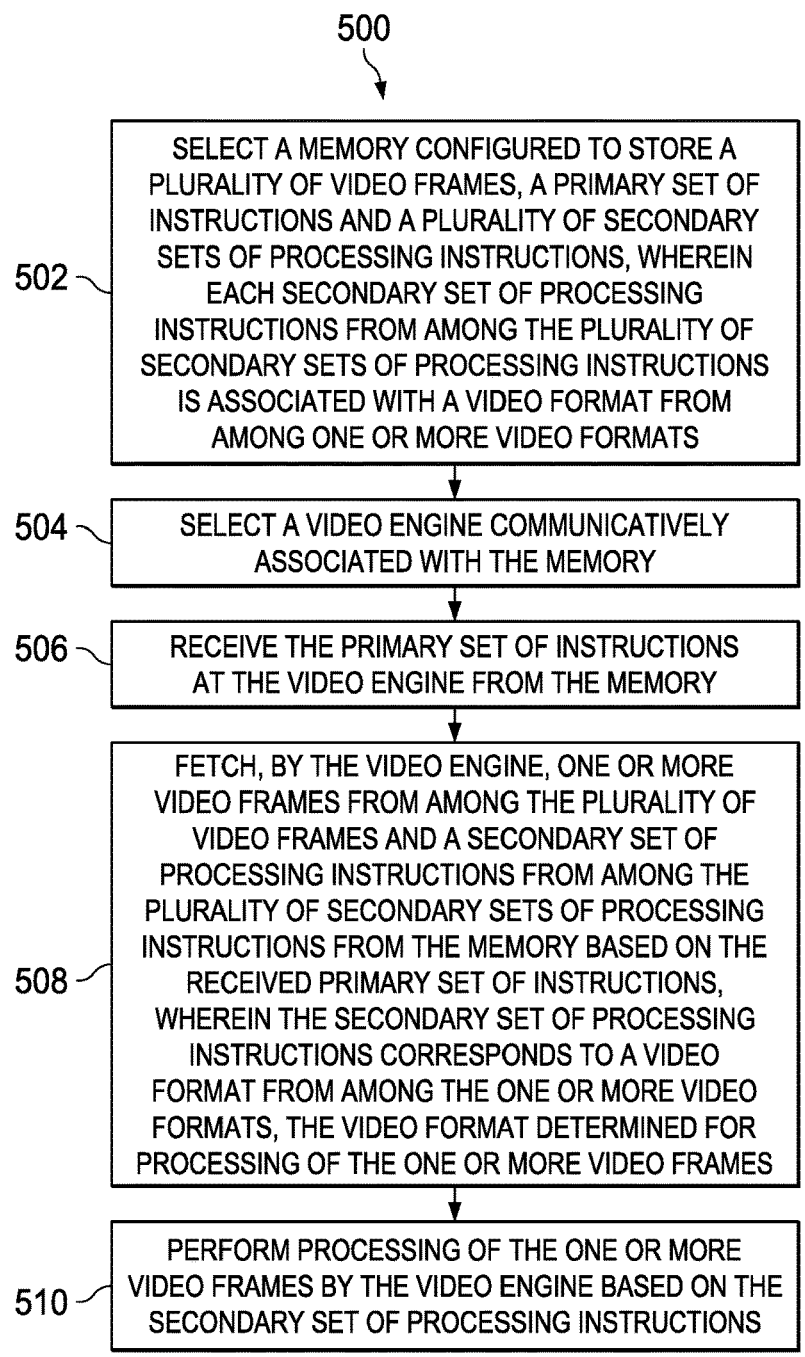
FIG. 5 is a flow diagram of an exemplary video processing method of processing of video frames based on one or more video formats in accordance with an embodiment.

FIG. 5 is a flow diagram of an exemplary video processing method 500 of processing of video frames based on one or more video formats in accordance with an embodiment. The method 500 depicted in the flow diagram may be executed by, for example, the video processing system 200 of FIGS. 2 and 3. Operations of the flowchart, and combinations of operation in the flowchart, may be implemented by, for example, hardware, firmware, a processor, circuitry and/or a different device associated with the execution of software that includes one or more computer program instructions. The operations of the method 500 are described herein with help of the video processing system 200. However, the operations of the method can be described and/or practiced by using a system other than the video processing system 200. The method 500 starts at operation 502.

At operation 502, a memory (for example, the memory 202 of FIG. 2) configured to store a plurality of video frames, a primary set of instructions and a plurality of secondary sets of processing instructions is selected. The video frames from among the plurality of video frames may be in one of encoded form or a raw form. In an embodiment, the primary set of instructions comprises format-independent set of instructions capable of facilitating a fetching of video frames and a secondary set of processing instructions from among the plurality of secondary sets of processing instructions from the memory. In an embodiment, each secondary set of processing instructions from among the plurality of secondary sets of processing instructions is associated with a video format from among one or more video formats. For example, a secondary set of processing instructions may correspond to instructions for processing video frames based on H.264 encoder video format. In another example embodiment, a secondary set of processing instructions may correspond to instructions for processing video frames based on MPEG-4 decoder video format. At operation 504, a video engine (for example, the video engine 204 of FIG. 2) communicatively associated with the memory is selected. In an embodiment, the video engine is a multi-format video engine configured to perform a processing of the video frames based on one or more video formats. The selection of the memory and the video engine may be performed for initiating processing of the video frames. In an embodiment, such a selection may be performed by a video processing system, such as the video processing system 200.

At operation 506, the primary set of instructions is received at the video engine from the memory. In an embodiment, a processor (for example, the processor 206 of FIG. 2) may be configured to facilitate a loading of the primary set of instructions from the memory into the video engine. In an embodiment, the video engine is configured to perform a self-loading (for example, fetching and loading) of the primary set of instructions from the memory. At operation 508, one or more video frames from among the plurality of video frames and a secondary set of processing instructions from among the plurality of secondary sets of processing instructions are fetched by the video engine from the memory based on the primary set of instructions. In an embodiment, the secondary set of processing instructions corresponds to a video format of the one or more video formats determined for the processing of the one or more video frames. For example, if the video frames are determined to be processed based on the H.264 encoder video format, then the video engine is configured to fetch the video frames (to be processed based on the H.264 encoder format) and a secondary set of processing instructions corresponding to the H.264 encoder video format from the memory for the processing of the video frames based on the requisite video format. In an embodiment, the primary set of instructions may include pointers to memory locations, wherein the pointers may be implemented to fetch video frames and a secondary set of processing instructions corresponding to various video formats, thereby enabling a fetching and loading of the video frames and the secondary set of processing instructions.

The determination of the video format for the processing of the video frames may be performed based on a user application corresponding to the one or more video frames. In an embodiment, the processor may be configured to determine the video format that is applicable to process the one or more video frames. In an embodiment, the video format for the processing of the one or more video frames may be pre-determined or determined dynamically, by the processor based on a nature of the application (for example, a MPEG-2 encoded movie clip may be processed using a MPEG-2 decoder video format) and/or system enabled settings (for example, pre-defined setting of encoding surveillance video data based on a H. 264 video format).

In an embodiment, the primary set of instructions may be loaded into the video engine at the time of initiation of the video engine. The loading of the video frames and the secondary set of processing instructions may be performed based on the primary set of instructions in an on-going manner thereafter based on various applications. As explained above, the video engine performs self-loading of the video frames and the secondary set of processing instructions based on the loaded primary set of processing instructions. The self-loading of the video frames and the secondary set of processing instructions precludes the utilization of the processor for each switching of the encoder/decoder software (for example, a secondary set of processing instructions) on the video engine, thereby decreasing the loading of the processor 206, which may be especially useful in low latency applications, such as video calls/surveillance applications, where the encoder/decoder software has to be changed frequently in the video engine. Further specifications, such as executing a high-resolution frame rate, may be met as a result of the processing of the video frames by the multi-format video engine.

At operation 510, the video processing method 500 includes processing of the one or more video frames by the video engine based on the secondary set of processing instructions corresponding to the video format. In an embodiment, the video engine may include one or more hardware accelerator modules (such as the hardware accelerator modules 322-326 of FIG. 3) configured to perform at least one of encoding and decoding of the plurality of video frames based on the one or more video formats. In an embodiment, each hardware accelerator module from among the one or more hardware accelerator modules may be associated with a fixed functionality associated with encoding/decoding of video frames, such as for example, entropy coding, motion compensation, loop filter, and the like. The format-specific secondary set of processing instructions may serve as the software for the hardware accelerator modules that enables the hardware accelerator modules to process of the video frames based on the determined video format. The video processing method 500 ends at 510.

Figure 6:
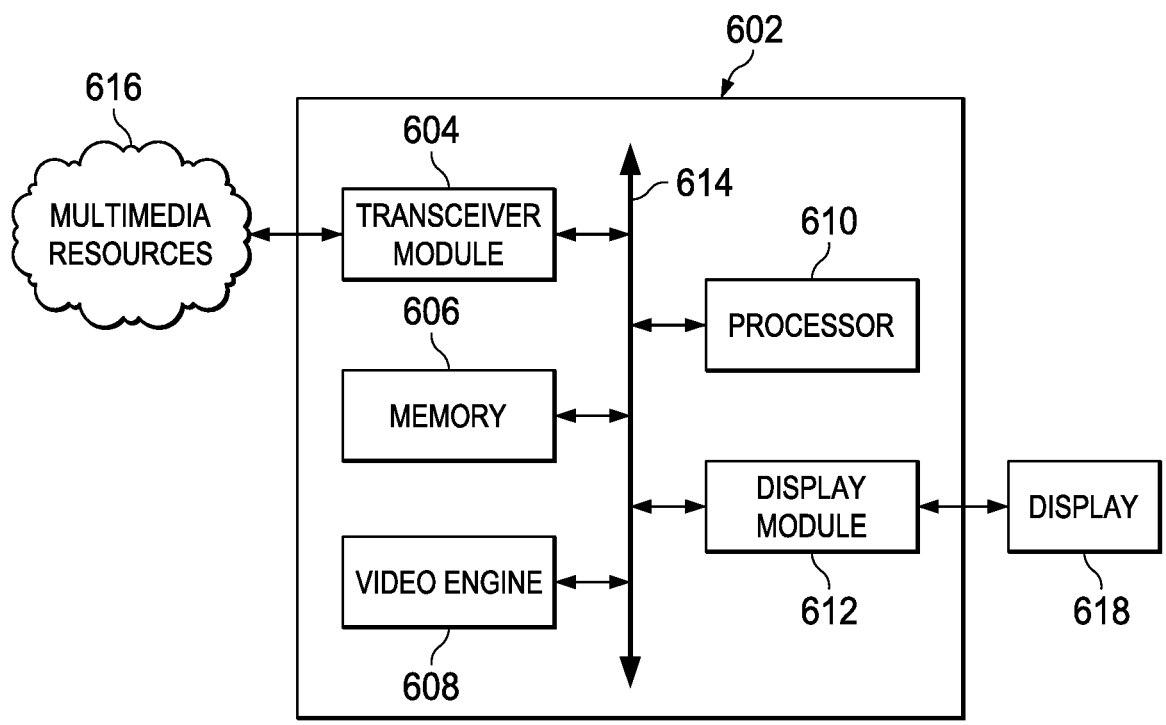
FIG. 6 is a block diagram of an exemplary integrated circuit configured to process video frames based on one or more video formats in accordance with an embodiment.

FIG. 6 is a block diagram of an integrated circuit 602 configured to process video frames based on one or more video formats, in accordance with an embodiment. In an embodiment, the video processing system 200 of FIG. 2 may be embodied at least partially in the form of the integrated circuit 602. The integrated circuit 602 comprises a transceiver module 604, a memory 606, a video engine 608, a processor 610 and a display module 612. The transceiver module 604, the memory 606, the video engine 608, the processor 610 and the display module 612 are communicatively associated or coupled with each other using data path 614. As such, it is noted that at least some of the components described below in connection with the integrated circuit 602 may be optional, and, thus, in an exemplary embodiment the integrated circuit 602 may include more, less or different components than those described in connection with the exemplary embodiment of FIG. 6. In an embodiment, the integrated circuit 602 may include only the memory 606 and the video engine 608.

The transceiver module 604 is communicatively associated or coupled with a plurality of multimedia resources 616 and is configured to receive video frames associated with video data from one or more multimedia resources from among the plurality of multimedia resources 616. Examples of the multimedia resources may include, but are not limited to (1) remote multimedia systems (2) media capture devices, such as, for example, a camera, camcorders and the like, and (3) multimedia storage devices, such as, for example, magnetic tapes, disks, computer-readable media, and the like. In an embodiment, the transceiver module 604 may include an antenna and/or network connectors configured to couple with or connect to wired networks (for example, local area networks (LANs)) and wireless networks (for example, cellular networks), or a combination thereof (for example, the Internet). Examples of network connectors may include a universal serial bus (USB) interface, a wireless LAN interface, an infrared interface, an Ethernet port, and the like.

The memory 606 is configured to store the video frames, a primary set of instructions and a plurality of secondary set of processing instructions. In an embodiment, the memory 606 may be substantially similar to the memory 202 of system 200 of FIG. 2. The memory 606 is configured to perform functions as discussed in FIG. 2, which are not repeated herein for the sake of brevity. Examples of memory 606 may include, but are not limited to, RAM, dual port RAM, SDRAM, DDR SDRAM, and the like.

The video engine 608 is configured to perform processing (for example, encoding and/or decoding) of video frames associated with the video data. In an embodiment, the video engine 608 may be configured to encode the video frames and provide the video frames to transceiver module 604 for transmission purposes or to memory 606 for storage purposes. In an embodiment, the video engine 608 may be substantially similar to the video engine 204 of system 200 of FIG. 2. The video engine 608 is configured to perform functions as discussed in FIG. 2, which are not repeated herein for the sake of brevity. In an embodiment, the processor 610 may be substantially similar to the processor 206 of system 200 of FIG. 2 and may be configured to perform functions as discussed in FIG. 2, which are not repeated herein for the sake of brevity.

The display module 612 is configured to facilitate a display of the video data on display 618. The display 618 may be facilitated, for example, in response to a user input received using a user interface (not shown in FIG. 6).

Examples of display 618 may include a liquid crystal display (LCD) panel, a plasma display panel, a field emission display and the like.

In an embodiment the integrated circuit 602 may be an application processor chip. In an embodiment, the integrated circuit 602 may be a part of a particular or shared processor chip that is embedded within a multimedia system. Examples of the multimedia system may include, but are not limited to, (1) multimedia devices, such as, for example, cellular phones, digital video cameras and digital camcorders; (2) data processing devices, such as, for example, personal computers, laptops and personal digital assistants; and (3) consumer electronics, such as, for example, set top boxes, digital video disk (DVD) players and video network servers.

Without in any way limiting the scope, interpretation, or application of the claims appearing below, advantages of one or more of the exemplary embodiments disclosed herein include reducing utilization of a processor by facilitating self-loading of processing instructions and video frames by a multi-format video engine. As explained above, the video engine performs self-loading of the video frames and the secondary set of processing instructions based on the loaded primary set of processing instructions. The self-loading of the video frames and the secondary set of processing instructions precludes utilization of the processor for each switching of the encoder/decoder software on the video engine, thereby decreasing the loading of the processor. For low-latency applications, such as video calls or surveillance applications which entail changing applicable video format multiple times in the video engine, the self-loading of the instructions and the video frames may lead to sizable savings with respect to processor capacity. Further, application specifications, such as executing a high-resolution frame rate, may be met as a result of processing of the video frames by the multi-format video engine.

Although the present technology has been described with reference to specific exemplary embodiments, it is noted that various modifications and changes may be made to these embodiments without departing from the broad spirit and scope of the present technology. For example, the various devices, modules, analyzers, generators, etc., described herein may be enabled and operated using hardware circuitry (for example, complementary metal oxide semiconductor (CMOS) based logic circuitry), firmware, software and/or any combination of hardware, firmware, and/or software (for example, embodied in a machine-readable medium). For example, the various electrical structures and methods may be embodied using transistors, logic gates, and electrical circuits (for example, application specific integrated circuit (ASIC) circuitry and/or in Digital Signal Processor (DSP) circuitry).

Particularly, the system 200, the memory 202, the video engine 204 and the processor 206 may be enabled using software and/or using transistors, logic gates, and electrical circuits (for example, integrated circuit circuitry such as ASIC circuitry). Various embodiments of the present disclosure may include one or more computer programs stored or otherwise embodied on a computer-readable medium, wherein the computer programs are configured to cause a processor or computer to perform one or more operations. A computer-readable medium storing, embodying, or encoded with a computer program, or similar language, may be embodied as a tangible data storage device storing one or more software programs that are configured to cause a processor or computer to perform one or more operations. Such operations may be, for example, any of the steps or operations described herein. Additionally, a tangible data storage device may be embodied as one or more volatile memory devices, one or more non-volatile memory devices, and/or a combination of one or more volatile memory devices and non-volatile memory devices.

Also, techniques, devices, subsystems and methods described and illustrated in the various embodiments as discrete or separate may be combined or integrated with other systems, modules, techniques, or methods without departing from the scope of the present technology. Other items shown or discussed as directly coupled or communicating with each other may be coupled through some interface or device, such that the items may no longer be considered directly coupled with each other but may still be indirectly coupled and in communication, whether electrically, mechanically, or otherwise, with one another. Other examples of changes, substitutions, and alterations ascertainable by one skilled in the art, upon or subsequent to studying the exemplary embodiments disclosed herein, may be made without departing from the spirit and scope of the present technology.

It should be noted that reference throughout this specification to features, advantages, or similar language does not imply that all of the features and advantages should be or are in any single embodiment. Rather, language referring to the features and advantages may be understood to mean that a specific feature, advantage, or characteristic described in connection with an embodiment may be included in at least one embodiment of the present technology. Thus, discussions of the features and advantages, and similar language, throughout this specification may, but do not necessarily, refer to the same embodiment.

Various embodiments of the present disclosure, as discussed above, may be practiced with steps and/or operations in a different order, and/or with hardware elements in configurations which are different than those which are disclosed. Therefore, although the technology has been described based upon these exemplary embodiments, it is noted that certain modifications, variations, and alternative constructions may be apparent and well within the spirit and scope of the technology. Although various exemplary embodiments of the present technology are described herein in a language specific to structural features and/or methodological acts, the subject matter defined in the appended claims is not necessarily limited to the specific features or acts described above. Rather, the specific features and acts described above are disclosed as exemplary forms of implementing the claims.

What is claimed is:

1. A system, comprising:
   a memory; and
   a video engine communicatively coupled to the memory, the video engine including a memory module, a processing module, and a direct memory access (DMA) module, wherein the processing module is configured to program the DMA module to fetch a primary set of instructions from the memory to configure the DMA module to:
   receive a first set of video frames in a first format and a second set of video frames in a second format from the memory;
   access the memory module to load the first and second set of video frames to the memory module while the processing module is sleeping;
   receive a first set of processing instructions and a second set of processing instructions from the memory while the processing module is sleeping;

access the memory module to load the first set of processing instructions and the second set of processing instructions to the memory module while the processing module is sleeping; and responsive to loading the first and second set of video frames to the memory module and receiving the first and second set of processing instructions, interrupt the processing module; and the processing module configured to:

access the memory module to process the first set of video frames based on the first set of processing instructions; and access the memory module to process the second set of video frames based on the second set of processing instructions;

wherein access to the memory module is staggered between the processing module and the DMA module such that the processing module is permitted to access the memory module during a first time period and the DMA module is permitted to access to the memory module during a second time period subsequent to the first time period; and wherein the processing module is not permitted to access the memory module during the second time period.

2. The system of claim 1, wherein DMA module is further configured to:

determine that the second set of video frames is in the second format.

3. The system of claim 1, wherein the first format is one of an encoding format and a decoding format associated with video compression standards from among H.261, H.263, H.264, moving pictures experts group (MPEG)-1, MPEG-2, MPEG-4, real video (RV)-8, RV-9, VP6, VP7, VP8, and high efficiency video coding (HEVC).

4. The system of claim 1, wherein the processing module comprises a hardware accelerator.

5. A method, comprising:

programming, by a processing module, a direct memory access (DMA) module to fetch a primary set of instructions from a memory;

in response to the primary set of instructions, receiving, by DMA module, a first set of video frames in a first format and a second set of video frames in a second format from the memory;

accessing, by the DMA module, a memory module to load the first and second set of video frames to the memory module while the processing module is sleeping;

receiving, by the DMA module, a first set of processing instructions and a second set of processing instructions from the memory while the processing module is sleeping;

accessing, by the DMA module, the memory module to load the first set of processing instructions and the second set of processing instructions to the memory module while the processing module is sleeping;

responsive to loading the first and second set of video frames to the memory module and receiving the first and second set of processing instructions, interrupting the processing module by the DMA module;

accessing, by the processing module, the memory module to process the first set of video frames based on the first set of processing instructions; and accessing, by the processing module, the second set of video frames based on the second set of processing instructions;

wherein access to the memory module is staggered between the processing module and the DMA module such that the processing module is permitted to access the memory module during a first time period and the DMA module is permitted to access to the memory module during a second time period subsequent to the first time period; and wherein the processing module is not permitted to access the memory module during the second time period.

6. The method of claim 5, further comprising determine that the second set of video frames is in the second format.

7. The method of claim 5, wherein the first format is one of an encoding format and a decoding format associated with video compression standards from among H.261, H.263, H.264, moving pictures experts group (MPEG)-1, MPEG-2, MPEG-4, real video (RV)-8, RV-9, VP6, VP7, VP8, and high efficiency video coding (HEVC).

8. The method of claim 5, wherein the processing module comprises a hardware accelerator.

* * * * *